United States Patent
Wiles et al.

(10) Patent No.: US 10,581,041 B2
(45) Date of Patent: Mar. 3, 2020

(54) BATTERY ARRAY PLATE ASSEMBLY WITH PRESSURE RETENTION PAD

(71) Applicant: Ford Global Technologies, LLC, Dearborn, MI (US)

(72) Inventors: Jacob Wiles, Plymouth, MI (US); Dylan Erb, Allen Park, MI (US); Alexander Bartlett, Wyandotte, MI (US); Bikram Singh, Royal Oak, MI (US); Baocheng Sun, Beverly Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 177 days.

(21) Appl. No.: 15/791,867

(22) Filed: Oct. 24, 2017

(65) Prior Publication Data

US 2019/0123317 A1  Apr. 25, 2019

(51) Int. Cl.
| H01M 2/10 | (2006.01) |
| H01M 10/04 | (2006.01) |
| H01M 10/0525 | (2010.01) |

(52) U.S. Cl.
CPC ....... *H01M 2/1094* (2013.01); *H01M 2/1077* (2013.01); *H01M 10/0481* (2013.01); *H01M 10/0525* (2013.01); *H01M 2220/20* (2013.01)

(58) Field of Classification Search
CPC .... H01M 2/10; H01M 2/1077; H01M 2/1094; H01M 10/0525
See application file for complete search history.

(56) References Cited

U.S. PATENT DOCUMENTS

| 9,297,591 | B1 * | 3/2016 | von Hack-Prestinary ................... F28F 9/001 |
| 9,680,178 | B2 | 6/2017 | Deponte et al. |
| 2014/0242429 | A1 | 8/2014 | Lee et al. |
| 2015/0321622 | A1 | 5/2015 | Gohl et al. |
| 2015/0357615 | A1 | 12/2015 | Maguire et al. |
| 2016/0049706 | A1 * | 2/2016 | Kerspe ................ H01M 10/625 429/120 |
| 2016/0133896 | A1 | 5/2016 | Baek et al. |
| 2016/0308186 | A1 * | 10/2016 | Han .................... H01M 2/1016 |
| 2017/0288183 | A1 * | 10/2017 | Sakai .................. H01M 2/1016 |

FOREIGN PATENT DOCUMENTS

| CN | 204333073 | 5/2015 |
| WO | 2017063874 | 4/2017 |

OTHER PUBLICATIONS

ERG Materials & Aerospace, Materials and Applications Guide, The Basics of Duocel Foam, Copyright 2011.

* cited by examiner

*Primary Examiner* — Karie O'Neill Apicella
(74) *Attorney, Agent, or Firm* — David Kelley; Carlson, Gaskey & Olds, P.C.

(57) ABSTRACT

An exemplary assembly includes, among other things, a group of battery cells, and an array plate assembly having a pressure retention pad that is configured to plastically deform in response to the group of battery cells expanding. An exemplary method includes, among other things, compressing a group of battery cells with an array plate assembly having a pressure retention pad, the pressure retention pad plastically deforming in response to the group of battery cells expanding.

18 Claims, 3 Drawing Sheets

BATTERY ARRAY PLATE ASSEMBLY WITH PRESSURE RETENTION PAD

TECHNICAL FIELD

This disclosure relates to array plate assemblies in electrified vehicle battery packs. An exemplary array plate assembly includes a pressure retention pad that facilitates maintaining a relatively consistent pressure on battery cells of the battery pack, even as the battery cells expand over time.

BACKGROUND

Generally, electrified vehicles differ from conventional motor vehicles because electrified vehicles are selectively driven using one or more battery-powered electric machines. Conventional motor vehicles, in contrast to electrified vehicles, are driven exclusively with an internal combustion engine. Electrified vehicles may use electric machines instead of, or in addition to, the internal combustion engine.

Example electrified vehicles include hybrid electric vehicles (HEVs), plug-in hybrid electric vehicles (PHEVs), fuel cell vehicles, and battery electric vehicles (BEVs). A powertrain for an electrified vehicle can include a high-voltage battery pack having battery cells that store electric power for powering the electric machines and other electrical loads of the electrified vehicle.

The battery pack includes a plurality of battery cells that store energy for powering the electrical loads. Pressure exerted on the battery cells during operation can influence the performance of the battery cells. From time to time, such as when charging the battery cells, the external profile of the battery cells may bulge or swell. The bulging or swelling can cause the dimensions of the battery cells to change, which can lead to increased pressure on the battery cells and can present packaging challenges.

SUMMARY

An assembly according to an exemplary aspect of the present disclosure includes, among other things, a group of battery cells, and an array plate assembly having a pressure retention pad that is configured to plastically deform in response to the group of battery cells expanding.

In a further non-limiting embodiment of the foregoing assembly, the pressure retention pad comprises an open-cell foam.

In a further non-limiting embodiment of any of the foregoing assemblies, the pressure retention pad is a carbon or carbon-based material.

In a further non-limiting embodiment of any of the foregoing assemblies, the pressure retention pad further includes a first and a second subplate. The open-cell foam is sandwiched between the first and the second subplate.

In a further non-limiting embodiment of any of the foregoing assemblies, the first and second subplate have a material composition that is the same as a material composition of the open-cell foam.

In a further non-limiting embodiment of any of the foregoing assemblies, the first subplate, the second subplate, and the open-cell foam are each a carbon or carbon-based material.

In a further non-limiting embodiment of any of the foregoing assemblies, the array plate assembly is positioned at a longitudinal end of the group of battery cells.

In a further non-limiting embodiment of any of the foregoing assemblies, the array plate assembly is a first array plate assembly at a first longitudinal end of the group of battery cells. The assembly further includes a second array plate assembly having a pressure retention pad at an opposing, second longitudinal end of the group of battery cells.

In a further non-limiting embodiment of any of the foregoing assemblies, the pressure retention pad is configured to plastically deform in response to a pressure on the pressure retention pad that is at or above five pounds per square inch.

In a further non-limiting embodiment of any of the foregoing assemblies, the pressure retention pad is configured such that a pressure exerted on the group of battery cells remains nominally the same as the pressure retention pad plastically deforms.

In a further non-limiting embodiment of any of the foregoing assemblies, the group of battery cells is disposed along a longitudinal axis, and the plastic deformation of the pressure retention pad decreases an axial width of the pressure retention pad.

A method according to an exemplary aspect of the present disclosure includes, among other things, compressing a group of battery cells with an array plate assembly having a pressure retention pad. The pressure retention pad plastically deforms in response to the group of battery cells expanding.

In a further non-limiting embodiment of the foregoing method, the pressure retention pad includes an open-cell foam.

In a further non-limiting embodiment of any of the foregoing methods, the open-cell foam is sandwiched between a first and second subplate of the array plate assembly.

In a further non-limiting embodiment of any of the foregoing methods, a material composition of the first and second subplates is the same as a material composition of the open-cell foam.

In a further non-limiting embodiment of any of the foregoing methods, the group of battery cells are distributed along a longitudinal axis, and the compressing is an axial compressing.

In a further non-limiting embodiment of any of the foregoing methods, the array plate assembly is a first end plate assembly at a first longitudinal end of the group of battery cells, and the compressing comprises compressing the group of battery cells between the first end plate assembly and a second end plate assembly at an opposing, second longitudinal end of the group of battery cells.

In a further non-limiting embodiment of any of the foregoing methods, the pressure retention pad plastically deforms in response to a pressure on the pressure retention pad that is at or above five pounds per square inch.

In a further non-limiting embodiment of any of the foregoing methods, a pressure exerted on the group of battery cells remains nominally the same as the pressure retention pad plastically deforms.

In a further non-limiting embodiment of any of the foregoing methods, the group of battery cells is disposed along a longitudinal axis, and plastically deforming the pressure retention pad decreases an axial width of the pressure retention pad.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure details battery assemblies for use within battery packs of electrified vehicles.

An exemplary battery assembly includes a group of battery cells and an array plate assembly. When one or more of the battery cells expand, a pressure retention pad of the array plate assembly can compress and plastically deform. The pressure retention pad can accommodate dimensional changes in the group of battery cells due to one or more of the battery cells expanding, while keeping a pressure on the battery cells within a desired range.

Figure 1:
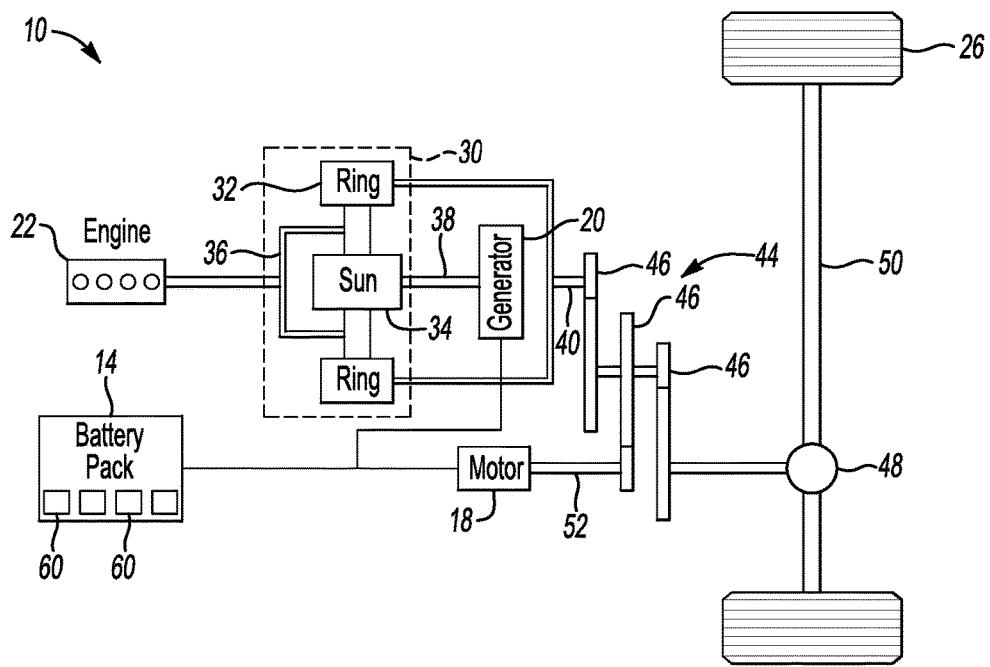
FIG. 1 illustrates a schematic view of a powertrain of an electrified vehicle.

FIG. 1 schematically illustrates a powertrain 10 for an electrified vehicle, which is a hybrid electric vehicle (HEV) in this example. Although depicted as an HEV, it should be understood that the concepts described herein are not limited to HEVs and could extend to other types of electrified vehicle, including, but not limited to, plug-in hybrid electric vehicles (PHEVs), battery electric vehicles (BEVs), fuel cell vehicles, etc.

The powertrain 10 includes a battery pack 14, a motor 18, a generator 20, and an internal combustion engine 22. The motor 18 and generator 20 are types of electric machines. The motor 18 and generator 20 may be separate or may have the form of a combined motor-generator.

In this embodiment, the powertrain 10 is a power-split powertrain system that employs a first drive system and a second drive system. The first and second drive systems generate torque to drive one or more sets of vehicle drive wheels 26 of the electrified vehicle. The first drive system includes a combination of the engine 22 and the generator 20. The second drive system includes at least the motor 18, the generator 20, and the battery pack 14. The motor 18 and the generator 20 are portions of an electric drive system of the powertrain 10.

The engine 22, which is an internal combustion engine in this example, and the generator 20 may be connected through a power transfer unit 30, such as a planetary gear set. Of course, other types of power transfer units, including other gear sets and transmissions, could be used to connect the engine 22 to the generator 20. In one non-limiting embodiment, the power transfer unit 30 is a planetary gear set that includes a ring gear 32, a sun gear 34, and a carrier assembly 36.

The generator 20 can be driven by engine 22 through the power transfer unit 30 to convert kinetic energy to electrical energy. The generator 20 can alternatively function as a motor to convert electrical energy into kinetic energy, thereby outputting torque to a shaft 38 connected to the power transfer unit 30. Because the generator 20 is operatively connected to the engine 22, the speed of the engine 22 can be controlled by the generator 20.

The ring gear 32 of the power transfer unit 30 can be connected to a shaft 40, which is connected to vehicle drive wheels 26 through a second power transfer unit 44. The second power transfer unit 44 may include a gear set having a plurality of gears 46. Other power transfer units may also be suitable.

The gears 46 transfer torque from the engine 22 to a differential 48 to ultimately provide traction to the vehicle drive wheels 26. The differential 48 may include a plurality of gears that enable the transfer of torque to the vehicle drive wheels 26. In this example, the second power transfer unit 44 is mechanically coupled to an axle 50 through the differential 48 to distribute torque to the vehicle drive wheels 26.

The motor 18 can also be employed to drive the vehicle drive wheels 26 by outputting torque to a shaft 52 that is also connected to the second power transfer unit 44. In one embodiment, the motor 18 and the generator 20 cooperate as part of a regenerative braking system in which both the motor 18 and the generator 20 can be employed as motors to output torque. For example, the motor 18 and the generator 20 can each output electrical power to the battery pack 14.

Figure 2:
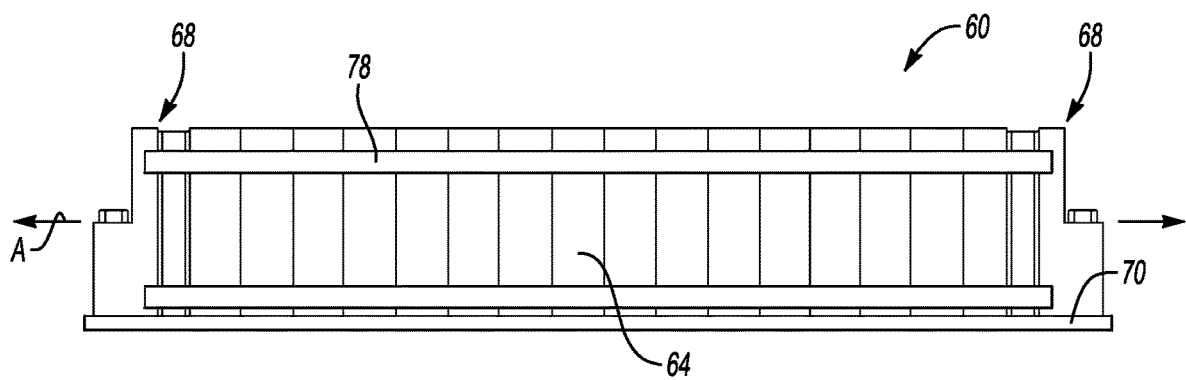
FIG. 2 illustrates an array from a battery pack within the powertrain of FIG. 1.

Referring now to FIG. 2 with continuing reference to FIG. 1, the battery pack 14 provides a relatively high-voltage battery that stores generated electrical power and outputs electrical power to operate the motor 18, the generator 20, or both. The battery pack 14 includes at least one battery array 60 having a group of individual battery cells 64 arranged side-by-side along a longitudinal axis A.

The group of battery cells 64 is sometimes referred to as a "cell stack." In this embodiment, the battery cells 64 are lithium-ion pouch cells. However, battery cells having other geometries (cylindrical, prismatic, etc.), other chemistries (nickel-metal hydride, lead-acid, etc.), or both, could alternatively be utilized.

The group of battery cells 64 disposed axially between a pair of array plate assemblies 68. One of the array plate assemblies 68 is disposed at each longitudinal end of the group of battery cells 64. The battery cells 64 and the array plate assemblies 68 are disposed on a thermal exchange plate 70, which can be used to, for example, convey thermal energy from the battery array 60 to maintain components of the battery array 60 below a desired temperature.

Tensioning members 72 extend between the array plate assemblies 68. The tensioning members 72 can be, for example, tensioning rods or bind bars. Tightening or torquing down the tensioning members 72 draws the array plate assemblies 68 closer together along the axis A, which compresses the group of battery cells 64 along the axis A. The tensioning can be set, for example, such that a force of about 5 pounds per square inch (about 34 Kilopascals) is applied axially to the battery cells 64.

As the battery cells 64 operate, the battery cells 64 can expand or bulge. If not addressed, the expansion can cause pressure on the battery cells 64 to increase above a desired level.

Figure 3:
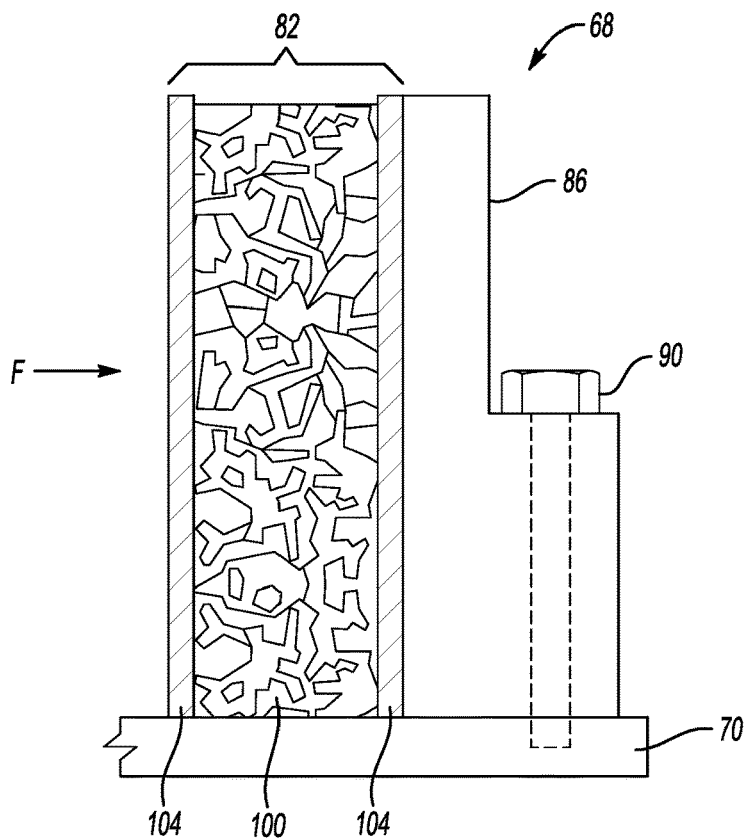
FIG. 3 illustrates a side view of an array plate assembly from the array of FIG. 2 according to an exemplary embodiment.
Figure 4:
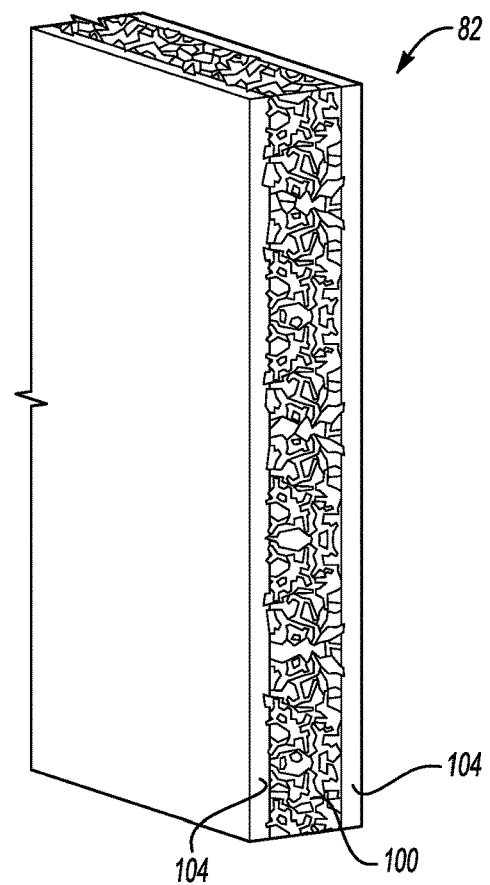
FIG. 4 illustrates a perspective view of a pressure retention pad of the array plate assembly of FIG. 3.

Referring now to FIGS. 3 and 4 with continuing reference to FIG. 2, the array plate assembly 68 includes a pressure retention pad 82 utilized to accommodate axial expansion of the battery cells 64. In this exemplary embodiment, the pressure retention pad 82 is fixed to a primary plate 86 of the array plate assembly.

The axial position of the primary plates 86 of the array plate assemblies 68 is fixed relative to each other. To fix the axial positions of the primary plates 86, mechanical fasteners 90 extend through a portion of the primary plate 86 and mechanically fasten the primary plate 86 to the thermal exchange plate 70. The primary plates 86 could be fastened to other structures in other examples. The primary plates 86 could also be fastened in other ways, such as by brazing or welding. The primary plates 86 can be a metal or metal-alloy. In a specific example, the primary plates 86 are aluminum.

The pressure retention pad 82 includes, in this exemplary embodiment, an open-cell foam 100 sandwiched between a first subplate 104 and a second subplate 108. The open-cell foam 100 is a porous material with pores that are interconnected, rather than separated as bubbles, for example.

The open-cell foam 100 can be, for example, metallic, a carbon, or carbon-based material, or some combination of these. In this example, the open-cell foam 100 is a vitreous carbon. In other examples, the open-cell foam 100 is entirely a metal or metal alloy material.

Notably, the first subplate 104 and the second subplate 108 have a material composition, in the exemplary embodiment, that is the same as a material composition of the open-cell foam 100. Thus, in this example, the first subplate 104 and the second subplate 108 are also vitreous carbon.

In the exemplary non-limiting embodiment, the pressure retention pad 82 includes the open-cell foam 100 as an energy absorbing material. In other examples, other energy absorbing materials could be used instead of, or in addition to the open-cell foam 100. Other energy absorbing materials can include a honeycomb structure made of a metal or metal alloy.

The pressure retention pad 82 can be secured to the primary plate 86 via an adhesive. In another example, the tensioning of the array plate assemblies 68 toward each other holds the position of the pressure retention pad 82.

The exemplary pressure retention pad 82 is shown as incorporated within the array plate assembly 68 at an axial end of the group of battery cells 64. In other examples, the pressure retention pad 82 and remaining portions of the array plate assembly 68 could be distributed elsewhere within the array 60, such as between axially adjacent battery cells 64.

As battery cells 64 expand, a force F (FIG. 3) applied to the array plate assembly 68 by the battery cells 64 increases. The open-cell foam 100 can be configured such that, when the force F exceeds a threshold value, say 5 pounds per square inch, the open-cell foam 100 is plastically deformed. The plastic deformation permits the pressure retention pad 82 to collapse axially such that the first subplate 104 moves axially closer to the second subplate 108. This movement of the first subplate 104 permits the battery cells 64 to expand axially. Thus, the pressure on the battery cells 64 does not rise above a desired value.

Figure 5:
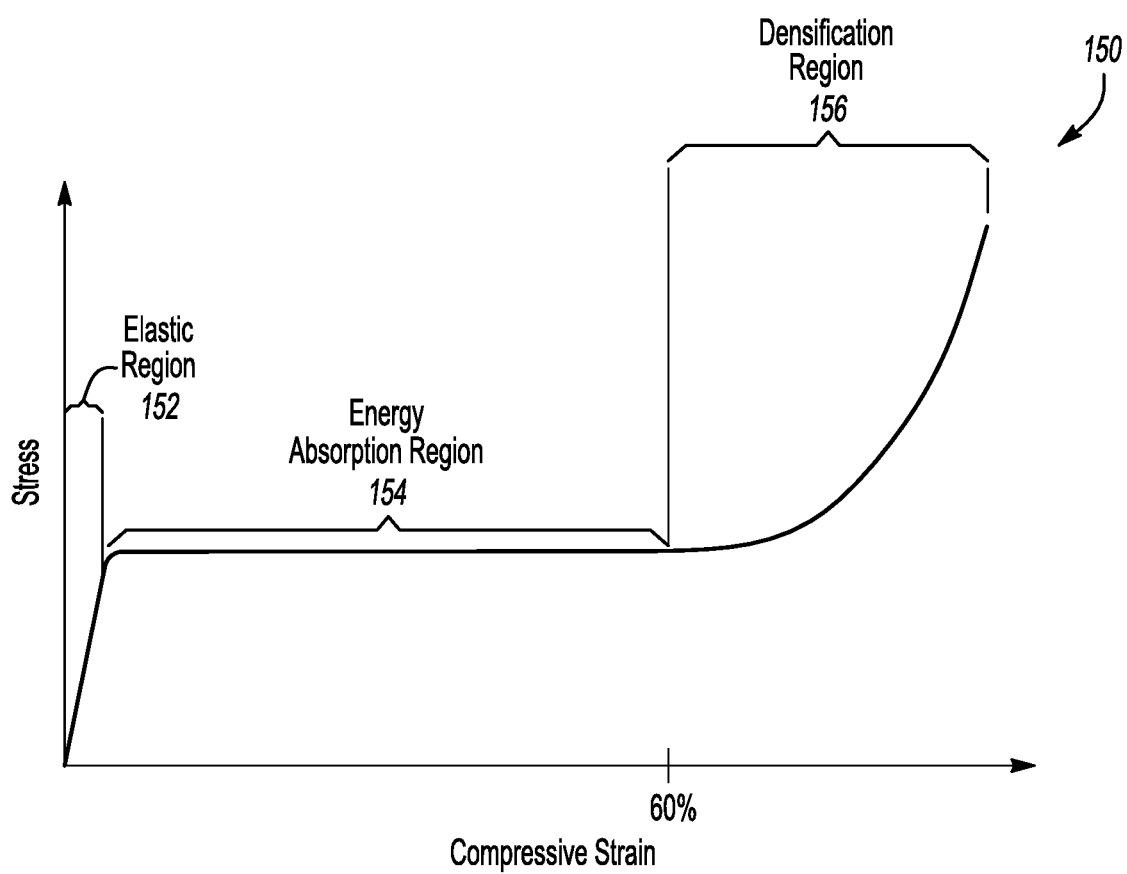
FIG. 5 illustrates a stress-strain curve for an open-cell foam material utilized within the pressure retention pad of FIG. 4.

Referring to FIG. 5 with continuing reference to FIGS. 2-4, an exemplary stress-strain curve 150 for the open-cell foam 100 includes an elastic region 152, an energy absorption region 154, and a densification region 156. Notably, within the energy absorption region 154, the open-cell foam 100 can maintain a nominally constant pressure as compressive strain increases.

If the battery cells 64 bulge such the force F applies a compressive strain on the array plate assembly 68 that does not exceed the elastic region 152, the open-cell foam 100 will compress from a designed position, but then substantially return to the design position once the force F is removed.

If the battery cells 64 bulge such that the force F applies a compressive strain on the array plate assembly 68 that places the open-cell foam 100 with the energy absorption region 154, the open-cell foam 100 will compress from the design position of FIG. 3. The open-cell foam 100, however, will not return all the way to the design position if the force F is removed. Instead, the open-cell foam 100 will rebound an amount substantially corresponding to the elastic region 152.

The compression of the open-cell foam 100 within the energy absorption region permits the first subplate 104 to move close to the subplate 108. This movement accommodates bulging of the battery cells 64 along the axis A, without increasing the pressure on the battery cells 64 to be above a desired level.

As compressive strain on the open-cell foam 100 increases due to addition bulging of one or more of the battery cells 64, the open-cell foam 100 gradually compresses axially while maintaining a relatively constant pressure on the battery cells 64. The relatively constant pressure on the battery cells 64 is maintained despite dimensional variations between the battery cells 64 and reversible or irreversible expansion of the battery cells 64. The open-cell foam 100 is designed such that a force F would not cause the open-cell foam 100 to reach the densification region 156.

If, for example, a desired pressure on the battery cells 64 is from four to five pounds per square inch, the open-cell foam 100 can be designed to enter the energy absorption region in response to force F that exceeds five pounds per square inch.

In general, the pore density and material properties of the open-cell foam 100 can be tuned to achieve the optimal pressure for a given array design. For example, from the definition of compressive mechanical stress where stress is σ, a compression force is $F_N$, and area is A:

$$\sigma = \frac{F_N}{A}$$

The compression force $F_N$ required to cause the open-cell foam 100 to yield and plastically deform can thus be found by using the following equation:

$$F_N = \sigma_y A$$

Given an area of the exemplary battery cells 64 that is equal to 0.03 square meters, and a yield strength for the exemplary (vitreous carbon) open-cell foam 100 that is 0.033 megapascals, the compression force is 1 kilonewton as shown below:

$$F_N = 0.033 \, [\text{MPa}] 0.03 \, [\text{m}^2]$$

$$F_N = 1 \, [\text{kN}]$$

This amount of compression force is within the optimal region for the exemplary battery cells 64. Due to the compressive properties of the open-cell foam 100, this optimal force would be maintained for up to 60% strain of the pressure retention pad 82.

The estimated axial width of the battery cells 64 at their end of life can be estimated through testing. If an estimated axial width of the battery cells 64 at their end-of-life is known, an axially thickness of open-cell foam 100 within the pressure retention pad 82 can be selected to ensure that the 60% strain is not exceeded at end-of-life.

Exemplary features of some of the disclosed embodiments include array plate assemblies that include a pressure retention pad to reduce a likelihood of over or under-compressing battery cells within an array.

If battery cells within an array are under-compressed, thermal contact between the battery cells and thermal carriers, like a thermal exchange plate, can be compromised. Further, vibration resilience may be compromised.

If battery cells within an array are over-compressed, the battery cells may be damaged, experience an accelerated degradation of useful life. Over-compression can further warp areas of the array, or compromise thermal contact between the battery cells and thermal carriers. Additionally, over-compression could cause the array to contact surrounding structures, which may result in isolation faults. In particular, the pressure retention pad permits the battery cell to expand during operation, the overall array dimensions (e.g. bind bars), however, are maintained.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. An assembly, comprising:
a group of battery cells; and
an array plate assembly having a pressure retention pad that is configured to plastically deform in response to the group of battery cells expanding, wherein the array plate assembly compresses the group of battery cells, wherein the pressure retention pad includes an open-cell foam, wherein a portion of the open-cell foam is exposed through the array plate assembly.

2. The assembly of claim 1, wherein the pressure retention pad is a carbon or carbon-based material.

3. The assembly of claim 1, wherein the pressure retention pad further includes a first and a second subplate, the open-cell foam sandwiched between the first and the second subplate.

4. The assembly of claim 3, wherein the first and second subplate have a material composition that is the same as a material composition of the open-cell foam.

5. The assembly of claim 3, wherein the first subplate, the second subplate, and the open-cell foam are a carbon or carbon-based material.

6. The assembly of claim 1, wherein the group of battery cells are disposed along an axis, wherein the array plate assembly is positioned at a longitudinal end of the group of battery cells.

7. The assembly of claim 6, wherein the array plate assembly is a first array plate assembly at a first longitudinal end of the group of battery cells, and further comprising a second array plate assembly having a pressure retention pad at an opposing, second longitudinal end of the group of battery cells, wherein the first array plate assembly and the second array plate assembly each include a primary plate and an open-cell foam portion that is sandwiched between a first and a second subplate, wherein axial positions of the primary plates are fixed relative to each other.

8. The assembly of claim 1, wherein the pressure retention pad is configured such that a pressure exerted on the group of battery cells remains nominally the same as the pressure retention pad plastically deforms.

9. A method, comprising:
compressing a group of battery cells with an array plate assembly having a pressure retention pad, the pressure retention pad plastically deforming in response to the group of battery cells expanding, wherein the pressure retention pad includes an open-cell foam, wherein a portion of the open-cell foam is exposed through the array plate assembly.

10. The method of claim 9, wherein the open-cell foam is sandwiched between a first and second subplate of the array plate assembly.

11. A method, comprising:
compressing a group of battery cells with an array plate assembly having a pressure retention pad, the pressure retention pad plastically deforming in response to the group of battery cells expanding,
wherein the pressure retention pad includes an open-cell foam,
wherein the open-cell foam is sandwiched between a first and second subplate of the array plate assembly,
wherein a material composition of the first and second subplates is the same as a material composition of the open-cell foam.

12. The method of claim 9, wherein the group of battery cells are distributed along a longitudinal axis, and the compressing is an axial compressing.

13. The method of claim 12, wherein the array plate assembly is a first end plate assembly at a first longitudinal end of the group of battery cells, and the compressing comprises compressing the group of battery cells between the first end plate assembly and a second end plate assembly at an opposing, second longitudinal end of the group of battery cells.

14. The method of claim 9, wherein the pressure retention pad plastically deforms in response to a pressure on the pressure retention pad that is at or above five pounds per square inch.

15. The method of claim 9, wherein a pressure exerted on the group of battery cells remains nominally the same as the pressure retention pad plastically deforms.

16. The method of claim 9, wherein the group of battery cells is disposed along a longitudinal axis, and plastically deforming the pressure retention pad decreases an axial width of the pressure retention pad.

17. The assembly of claim 7, wherein the primary plates are fixed directly to a thermal exchange plate that extends from the first array plate assembly to the second array plate assembly.

18. The assembly of claim 17, wherein the subplates are axially misaligned with the primary plates such that the subplates are not axially overlapping with any portion of the primary plates.

* * * * *